(12) United States Patent
Singla et al.

(10) Patent No.: US 8,205,181 B1
(45) Date of Patent: Jun. 19, 2012

(54) VICTIM NET CROSSTALK REDUCTION

(75) Inventors: Sunil Kumar Singla, Ludhiana (IN); Sudhir Koul, Pleasanton, CA (US)

(73) Assignee: Applied Micro Circuits Corporation, San Diego, CA (US)

( * ) Notice: Subject to any disclaimer, the term of this patent is extended or adjusted under 35 U.S.C. 154(b) by 263 days.

(21) Appl. No.: 12/718,624

(22) Filed: Mar. 5, 2010

(51) Int. Cl.
*G06F 17/50* (2006.01)

(52) U.S. Cl. ........ 716/113; 716/108; 716/114; 716/115; 703/19

(58) Field of Classification Search .......... 716/108, 716/113, 114, 115; 703/19
See application file for complete search history.

(56) References Cited

U.S. PATENT DOCUMENTS

| 6,499,131 | B1* | 12/2002 | Savithri et al. | 716/115 |
| 6,637,014 | B2* | 10/2003 | Casavant | 716/114 |
| 6,988,255 | B2* | 1/2006 | Allen et al. | 716/103 |
| 7,251,797 | B2 | 7/2007 | Becer et al. | |
| 7,359,843 | B1* | 4/2008 | Keller et al. | 703/2 |
| 7,383,522 | B2* | 6/2008 | Murgai et al. | 716/113 |
| 7,519,932 | B2* | 4/2009 | Sakamoto | 716/115 |
| 2004/0015338 | A1* | 1/2004 | Lawrence et al. | 703/13 |
| 2006/0112359 | A1* | 5/2006 | Becer et al. | 716/6 |
| 2007/0226673 | A1* | 9/2007 | Habitz et al. | 716/14 |
| 2010/0083202 | A1* | 4/2010 | Shrivastava et al. | 716/6 |
| 2010/0218152 | A1* | 8/2010 | Tehrani et al. | 716/6 |

* cited by examiner

*Primary Examiner* — Naum Levin
(74) *Attorney, Agent, or Firm* — Law Office of Gerald Maliszewski; Gerald Maliszewski

(57) ABSTRACT

A circuit analysis tool is provided, enabled with software instructions, for minimizing circuit crosstalk. The instructions provide a first circuit connected to an output mode, having a last gate with a plurality of inputs and an output. The instructions calculate a first circuit victim net delay range (timing window) having a minimum delay (Vmin) and a maximum delay (Vmax). A second circuit is provided having an output connected to the output node to supply an aggressor net delay range (A1) having a minimum delay (A1min) and a maximum delay (A1max). The aggressor net delay range at least partially overlaps the victim net delay range. Without increasing the value of Vmax (critical path timing), the first circuit victim net delay range is shrunk, thereby minimizing crosstalk between the first and second circuits without an increase in first circuit maximum signal delay.

10 Claims, 11 Drawing Sheets

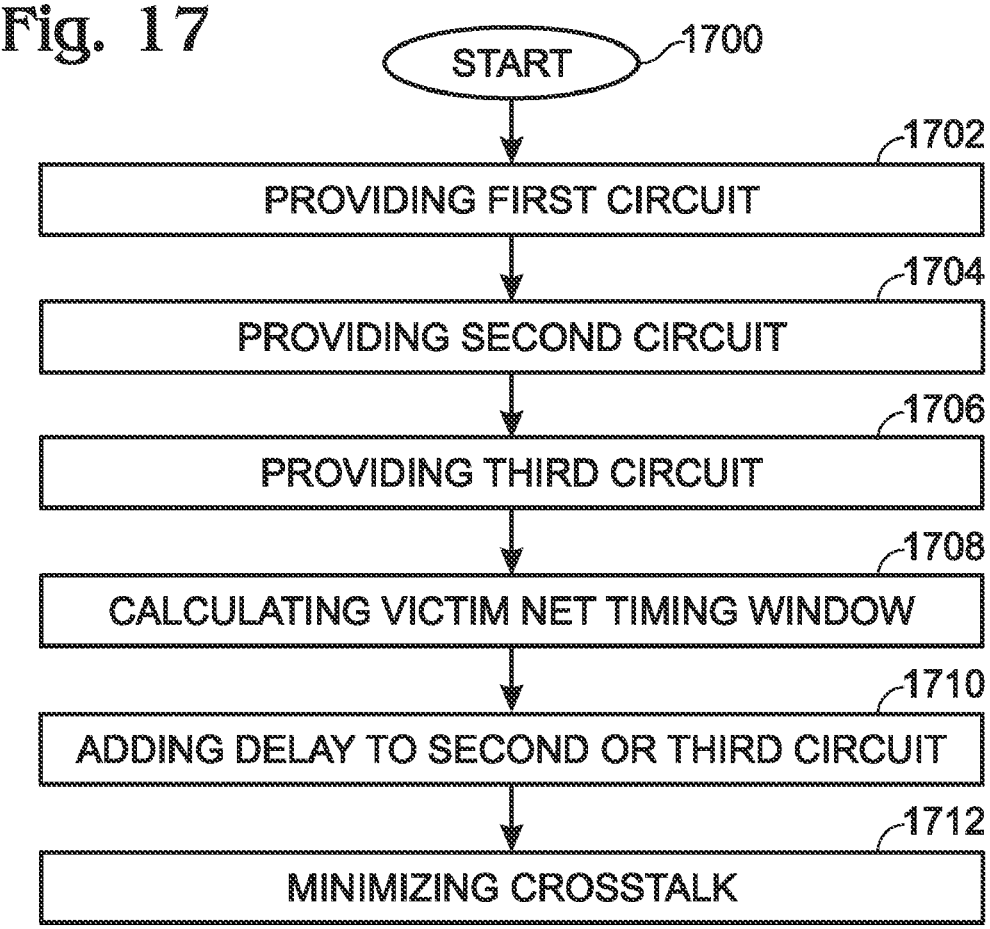

VICTIM NET CROSSTALK REDUCTION

BACKGROUND OF THE INVENTION

1. Field of the Invention

This invention generally relates to signal networking and, more particularly, to a system and method for minimizing the susceptibility of a signal network to aggressor net timing window overlap.

2. Description of the Related Art

The size, complexity, and operating or switching speeds of semiconductor ICs have increased, while feature geometries have decreased, and interconnect systems for such ICs have dramatically increased in complexity. In many situations these factors have increased the possible impact on timing due to noise resulting from parasitic capacitance within the interconnect system.

As noted in Wikipedia, in a synchronous digital system, data is supposed to move in lockstep, advancing one stage on each tick of the clock signal. This is enforced by synchronizing elements such as flip-flops or latches, which copy their input to their output when instructed to do so by the clock. To the first order, only two kinds of timing errors are possible in such a system. First, a hold time violation may occur, when an input signal changes too quickly after the clock's active transition. Second, a setup time violation may occur when a signal arrives too late, and misses the time when it should advance. The time when a signal arrives can vary due to many reasons—the input data may vary, the circuit may perform different operations, the temperature and voltage may change, and there are manufacturing differences in the exact construction of each part.

One approach that is used to analyze the impact of the parasitic capacitances is to model the interconnect system as an arrangement of nets (interconnections between gate outputs and interconnected gate inputs) inter-coupled with parasitic capacitors. Static Timing Analysis (STA) is used to develop early and late arrival times (timing window) for each relevant net or node. This timing window is enlarged by a worst case assessment of crosstalk noise for both early and late arrival times using noise aware STA. This worst case timing window is used for timing analysis of all paths through the corresponding net and a list of paths that fail timing requirements are provided. In static timing analysis, the word static alludes to the fact that this timing analysis is carried out in an input-independent manner, and purports to find the worst-case delay of the circuit over all possible input combinations.

More explicitly, STA is a method of computing the expected timing of a digital circuit without performing a simulation. High-performance ICs have conventionally been characterized by the clock frequency at which they operate. Gauging the operation of a circuit at a specified speed requires an ability to measure, during the design process, its delay at numerous steps. Moreover, delay calculations must be incorporated into the inner loop of timing optimizers at various phases of design, such as logic synthesis, layout (placement and routing), and in in-place optimizations performed late in the design cycle. While such timing measurements can theoretically be performed using a rigorous circuit simulation, such an approach is liable to be too slow to be practical. Static timing analysis plays a vital role in facilitating the fast and reasonably accurate measurement of circuit timing. The main goal of static timing analysis is to verify that despite these possible variations, all signals will arrive neither too early nor too late, and hence proper circuit operation can be assured.

Faster design times are a result of using simplified STA delay models, and a limited consideration of the effects of logical interactions between signals.

Also, since STA is capable of verifying every path, apart from helping locate setup and hold time violations, it can detect other serious problems like glitches, slow paths and clock skew. The critical path is defined as the path between an input and an output with the maximum delay. Once the circuit timing has been computed by one of the techniques below, the critical path can easily be found by using a traceback method. The arrival time of a signal is the time elapsed for a signal to arrive at a certain point. The reference, or time 0.0, is often taken as the arrival time of a clock signal. To calculate the arrival time, delay calculation of all the components in the path is required. Arrival times, and indeed almost all times in timing analysis, are normally kept as a pair of values—the earliest possible time at which a signal can change, and the latest.

Required time is the latest time at which a signal can arrive without making the clock cycle longer than desired. The computation of the required time proceeds as follows. At each primary output, the required times for rise/fall are set according to the specifications provided to the circuit. Next, a backward topological traversal is carried out, processing each gate when the required times at all of its fanouts are known. The slack associated with each connection is the difference between the required time and the arrival time. A positive slack (s) at a node implies that the arrival time at that node may be increased by (s) without affecting the overall delay of the circuit. Conversely, negative slack implies that a path is too slow, and the path must be sped up (or the reference signal delayed) if the whole circuit is to work at the desired speed.

The behavior of an electronic circuit is often dependent on various factors in its environment like temperature or local voltage variations. In such a case either STA needs to be performed for more than one such set of conditions, or STA must be prepared to work with a range of possible delays for each component, as opposed to a single value. If the design works at each extreme condition, then under the assumption of monotonic behavior, the design is also qualified for all intermediate points.

The use of corners in static timing analysis has several limitations. It may be overly optimistic, since it assumes perfect tracking—if one gate is fast, all gates are assumed fast, or if the voltage is low for one gate, it's also low for all others. Corners may also be overly pessimistic, for the worst case corner may seldom occur. In an IC, for example, it may not be rare to have one metal layer at the thin or thick end of its allowed range, but it would be very rare for all 10 layers to be at the same limit, since they are manufactured independently. Statistical STA, which replaces delays with distributions, and tracking with correlation, is a more sophisticated approach to the same problem.

FIG. 1 is a schematic diagram illustrating a timing window associated with a simple logic gate (prior art). As noted above, a timing window is the time during which a net can toggle its logical value. For the net output of a multi-input gate, there can be a set of values during which the net can toggle, as opposed to a single discrete time, thus creating a timing window (TW). The input "a" of the AND gate is changing at 3 ns and the input "b" is changing at 4.5 ns. So the timing window for the output "x" of this AND gate is 3 ns-4.5 ns, which means this net can toggle at any time in this time intervals, depending upon factors such as the process voltage temperature (PVT).

FIGS. 2A and 2B are, respectively, a schematic diagram of a network of victim and aggressor nets, and an associated timing diagram (prior art). Here, as in the figures to follow, the aggressor nets are shown connected to the victim net via parasitic capacitors. The parasitic capacitors are not necessarily circuit components, but represent an AC coupling between nets. The victim net is the AND gate of FIG. 1 with a timing window of 3 to 4.5 ns. The term "timing window" is understood be the range of signal delay through a net, and the terms "timing window" and "delay range" are used interchangeable. A first aggressor net has an output coupled to the victim net, and has a timing window of 2 to 3.5 ns. A second aggressor net has an output coupled to the victim net, and has a timing window of 4 to 5 ns. An "aggressor" is defined as any net that causes a coupled switching net to either slow or hasten its timing window. Alternately, an aggressor net may cause a coupled switching net to incorrectly change its logical value output. A victim net is a switching net being impacted by an aggressor net.

The crosstalk effect between any 2 nets depends upon following factors: 1) the coupling capacitance between the aggressor and victim nets; 2) how fast the aggressor and/or the victim nets are switching; and, 3) the timing window overlap of the aggressor and victim nets. The first two factors are addressed by physically increasing the spacing between aggressor and victim nets, thereby reducing the capacitive coupling, and by upsizing/downsizing the driver of aggressor/victim net to change the transition times of the nets. The problem with the above techniques is that they directly involve changing the cells/nets in the timing critical path, which may change the normal timing (timing without crosstalk) of the critical path, and lead to an iterative design process. However, there has been little discussion in the art addressing the third factor—of minimizing the timing window overlap.

It would be advantageous if net crosstalk could be eliminated by shrinking the timing window overlap between aggressor and victim nets.

It would be advantageous if the timing window overlap could be shrunk without affecting the timing critical path of either the victim or aggressor net.

SUMMARY OF THE INVENTION

Described herein are a system and design method for reducing the crosstalk noise of coupled nets by addressing the physical design of a system-on-chip (SoC), without relocating or modifying the actual components of the affected nets. The simultaneous switching of the aggressor and victim nets is avoided by changing the timing windows of the nets, while maintaining the timing critical path specifications. Unlike other crosstalk reduction techniques, such as driver upsize of the victim or coupling capacitance reduction, the physical layouts of the affected nets are not modified, so that the original static timing analysis (STA) remains valid, thus avoiding analysis iterations.

Accordingly, a circuit analysis tool is provided, enabled with software instructions, for minimizing circuit crosstalk. The instructions provide a first circuit connected to an output mode, having a last gate with a plurality of inputs and an output. The instructions calculate a first circuit victim net delay range (timing window) having a minimum delay (Vmin) and a maximum delay (Vmax). A second circuit is provided having an output connected to the output node to supply an aggressor net delay range (A1) having a minimum delay (A1$min$) and a maximum delay (A1$max$). The aggressor net delay range at least partially overlaps the victim net delay range. Without increasing the value of Vmax (critical path timing), the first circuit victim net delay range is shrunk, thereby minimizing crosstalk between the first and second circuits without an increase in first circuit maximum signal delay.

The first circuit victim net delay range is calculated by deriving a range of signal delays (Imin and Imax) for each last gate input (j). The range of signal delays for the gate output is calculated in response to comparing the gate delay range for each input (j), deriving the smallest Imin value and the largest Imax value. The victim net delay range is shrunk by, for each input (j), finding the difference between the largest Imax value and the I$_j$max value for that input. A circuit delay is added prior to each gate input, equal to the difference.

Additional details of the above-described method and a system of hardware devices connected with minimal signal crosstalk are provided below.

BRIEF DESCRIPTION OF THE DRAWINGS

FIG. 17 is a flowchart illustrating a variation of the circuit analysis tool of FIG. 16, for minimizing circuit crosstalk exposure.

DETAILED DESCRIPTION

Figure 1:
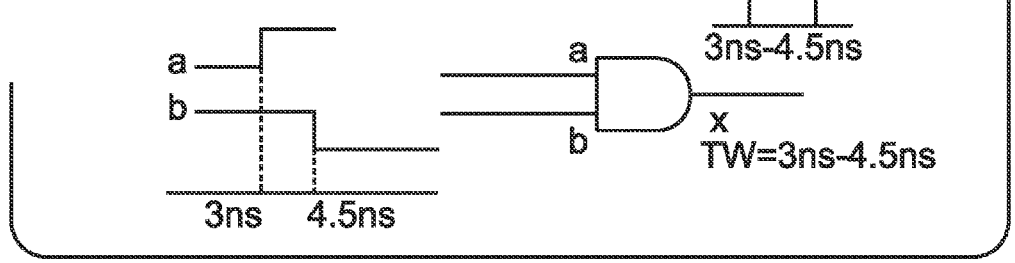
FIG. 1 is a schematic diagram illustrating a timing window associated with a simple logic gate (prior art).
Figure 2A:
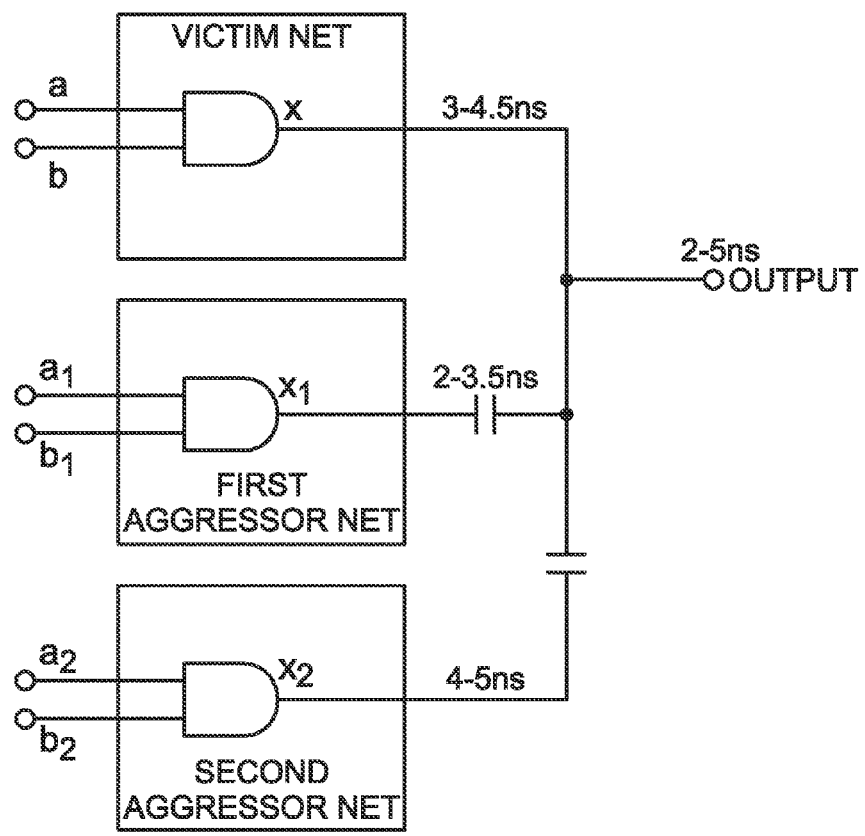
FIGS. 2A and 2B are, respectively, a schematic diagram of a network of victim and aggressor nets, and an associated timing diagram (prior art).
Figure 2B:
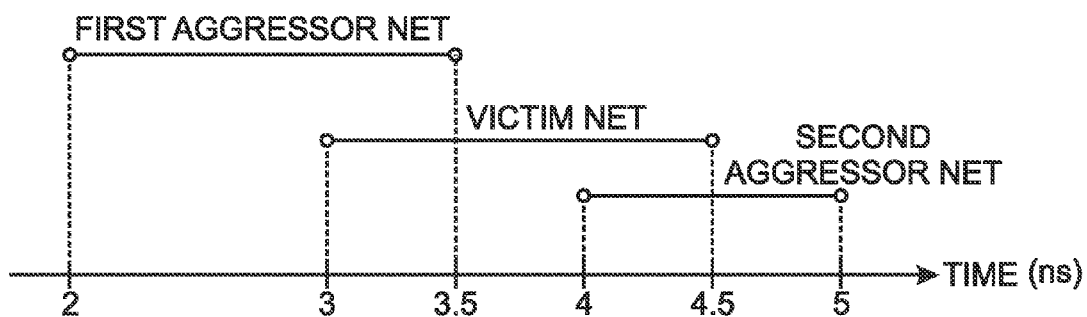
Figure 3:
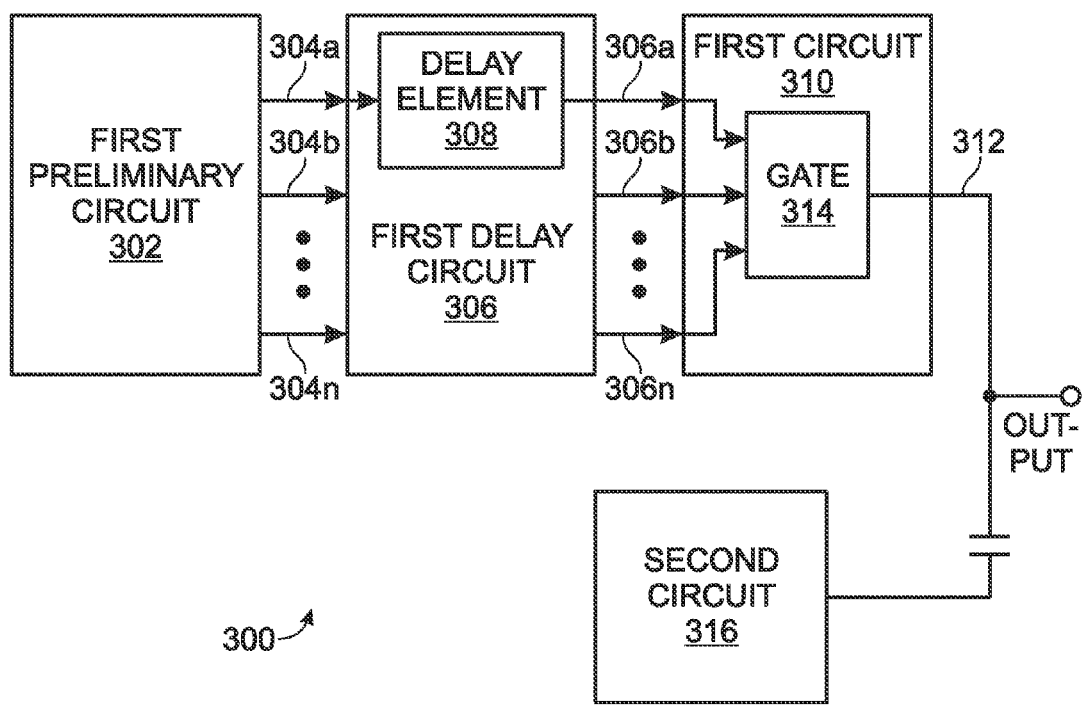
FIG. 3 is a schematic block diagram of a system of hardware devices connected with minimal signal crosstalk.

FIG. 3 is a schematic block diagram of a system of hardware devices connected with minimal signal crosstalk. The system 300 comprises a first preliminary circuit 302 having a first plurality of outputs 304 whose combination results in a preliminary net delay range (P) with a minimum delay (Pmin) and a maximum delay (Pmax), where (d1+P) at least partially overlaps aggressor net delay range (A1). Shown are outputs 304a through 304n, where n is a variable not limited to any particular value. A first delay circuit 306 has a first plurality of inputs 304 connected to the first preliminary circuit outputs, a first plurality of outputs 306 (306a through 306n). The first delay circuit 306 includes at least one delay element 308 with a delay (d) interposed between the first preliminary circuit minimum delay output (e.g., 304a) and the first delay circuit output 306a, resulting in a first shrunken net delay range with a minimum delay (Dmin) and a maximum delay (Dmax), where Dmin=d+Pmin, and Dmax=Pmax.

A first circuit 310 has a gate 314 with the delay d1, a first plurality of inputs connected to the first delay circuit outputs 306, and an output connected to an output node on line 312. The first circuit 310 has a victim net delay range with a minimum delay (Vmin) and a maximum delay (Vmax).

A second circuit 316 has an output connected to the output node on line 312 to supply the aggressor net delay range (A1) having a minimum delay (A1min) and a maximum delay (A1max). Ideally, the aggressor net delay range fails to overlap the victim net delay range, and Vmin>A1max.

Figure 4:
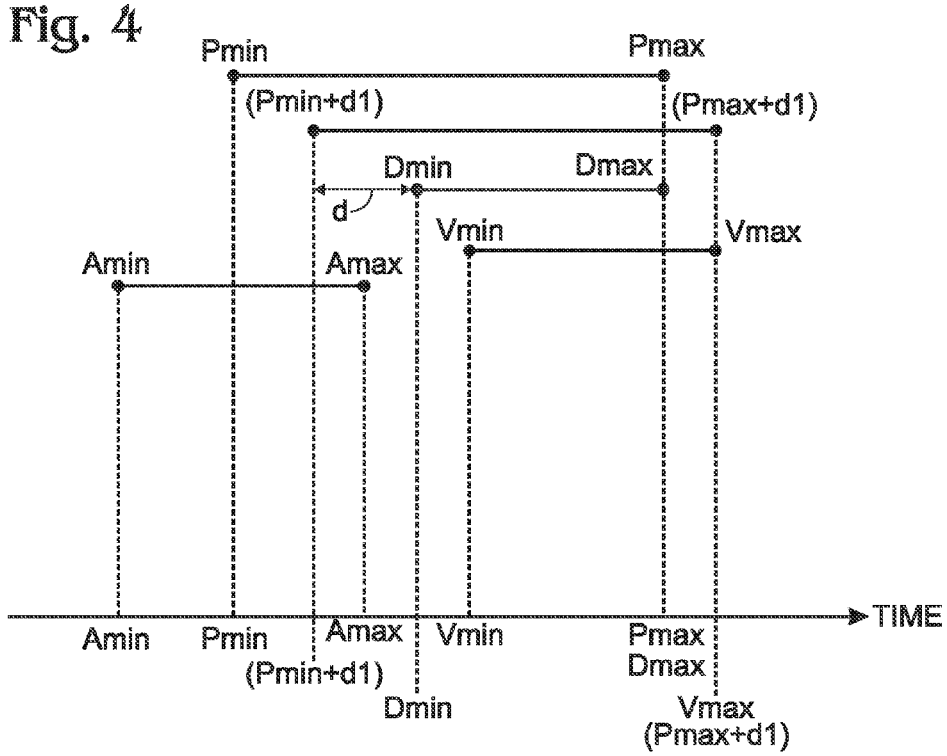
FIG. 4 is a timing diagram associated with the system of FIG. 3.

FIG. 4 is a timing diagram associated with the system of FIG. 3. Without the first delay circuit 306, the victim net delay range would be (Pmin+d1) to (Pmax+d1), which is the first preliminary circuit net delay range (P) plus the delay through the first circuit 310. This delay range would overlap the aggressor net delay range (A1), which would result in crosstalk between the first circuit 310 and the second circuit 316. The addition of the first delay circuit changes the value of Vmin, without affecting the critical delay path Vmax, and prevents the victim net from overlapping the aggressor net (A1).

Contrasting FIGS. 3 and 4, the first preliminary circuit 302 has a range of signal delays (Omin and Omax) for each output 306, and the first preliminary circuit delay range is found by contrasting the smallest (minimum delay) Omin value and the largest (maximum delay) Omax value. The first delay circuit 306 includes delay element 308 connected to each input 306, with a delay equal to the difference between the largest Omax value and the Omax value for that input.

To simplify this example, it is assumed that each output 306 has a discrete delay value, as opposed to a range of values. In this example, output 306a has the smallest Omin value of Pmin, while outputs 306b and 306n both have delays equal to (Pmin+d1), which is the largest Omax value. The delays associated with outputs 306b and 306n are not a problem, since these delays fall out of the aggressor net overlap, once the delay of the first circuit (d1) is added. However, the delay associated with output 306a (Omin=Pmin) would overlap the aggressor net, even after delay d1 is added. The addition of delay (d), associated with delay element 308 shrinks the victim net from (Pmin+d1) to Vmin ((Pmin+d1+d)), and prevents net overlap.

Figure 5:
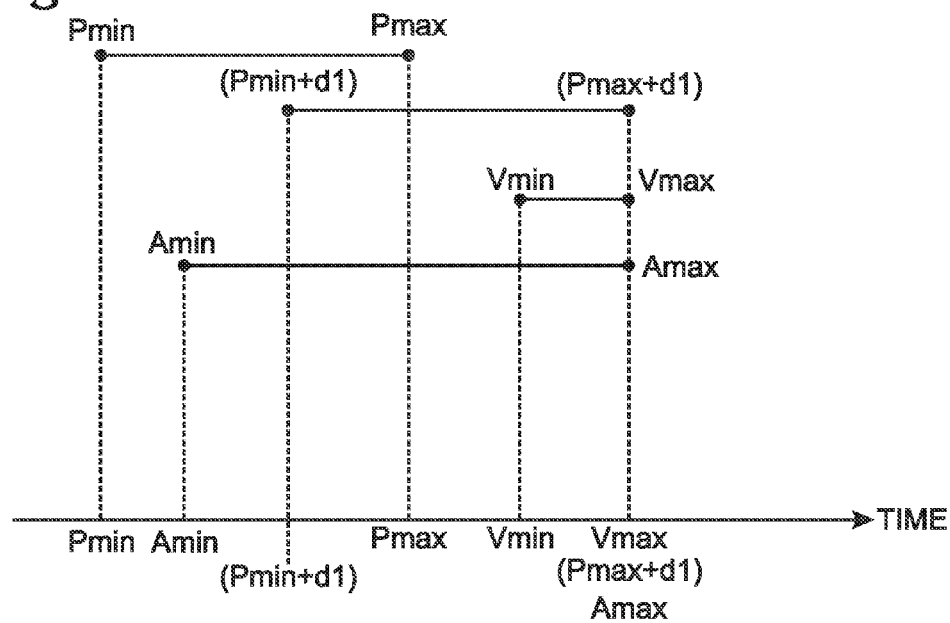
FIG. 5 is a timing diagram illustrating a scenario where the victim net is shrunk without completely eliminating overlap with the aggressor net.

FIG. 5 is a timing diagram illustrating a scenario where the victim net is shrunk without completely eliminating overlap with the aggressor net. In this scenario, the victim net "fits inside" the aggressor net, so that it is impossible to shrink the victim net to prevent overlap (without increasing the value of Vmax). However, the victim net can be shrunk, as shown, to at least minimize the overlap between the two nets.

Figure 6:
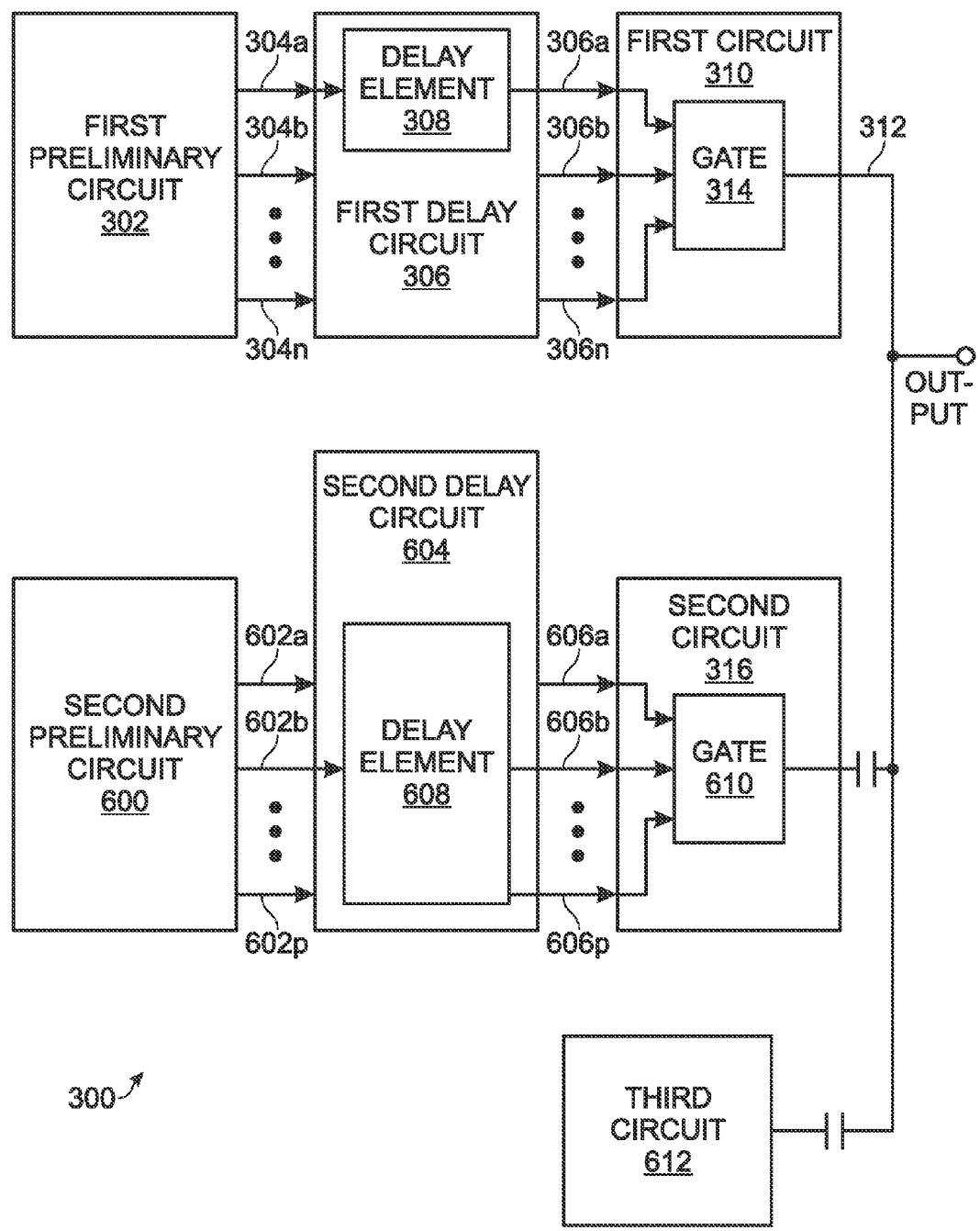
FIG. 6 is a schematic block diagram depicting a first variation of the system of FIG. 3.

FIG. 6 is a schematic block diagram depicting a first variation of the system of FIG. 3. In this aspect, both the victim net and the aggressor net A1 are shrunk to prevent overlap with a third circuit net A2. A second preliminary circuit 600 has a second plurality of outputs 602 whose combination results in a preliminary net delay range (S) with a minimum delay (Smin) and a maximum delay (Smax). (d2+S) at least partially overlaps the victim net delay range (Vmin to Vmax). Shown are outputs 602a through 602p, where p is a variable not limited to any particular value.

A second delay circuit 604 has a second plurality of inputs connected to the second preliminary circuit outputs 602, a second plurality of outputs 606a to 606p, and at least one delay element 608. Delay element 608 has a delay (Sd), and interposed between an input 602 and an output 606: The second delay circuit 604 has a second shrunken net delay range with a minimum delay (SDmin) and a maximum delay (SDmax), where SDmin=Sd+Smin, and SDmax=Smax. The second circuit 316 has a gate 610 with the delay d2, a second plurality of inputs connected to the second delay circuit outputs 606a through 606p, an output connected to the output node on line 312. The second circuit 316 has an aggressor net delay range with the minimum delay (A1min) greater than Vmax.

The second preliminary circuit 600 has a range of signal delays (Omin and Omax) for each output 602, and the second preliminary circuit delay range is found by contrasting the smallest Omin value and the largest Omax value. The second delay circuit 604 includes a delay element 608 connected to each input 602 with a delay equal to the difference between the largest Omax value and the Omax value for that input. Each input 602 may have a range of delays (Ojmin to Ojmax).

Also shown is a third circuit 612 having an aggressor net delay range (A2), characterized with a timing window A2min-A2max, which partially overlaps the victim net.

Figure 7:
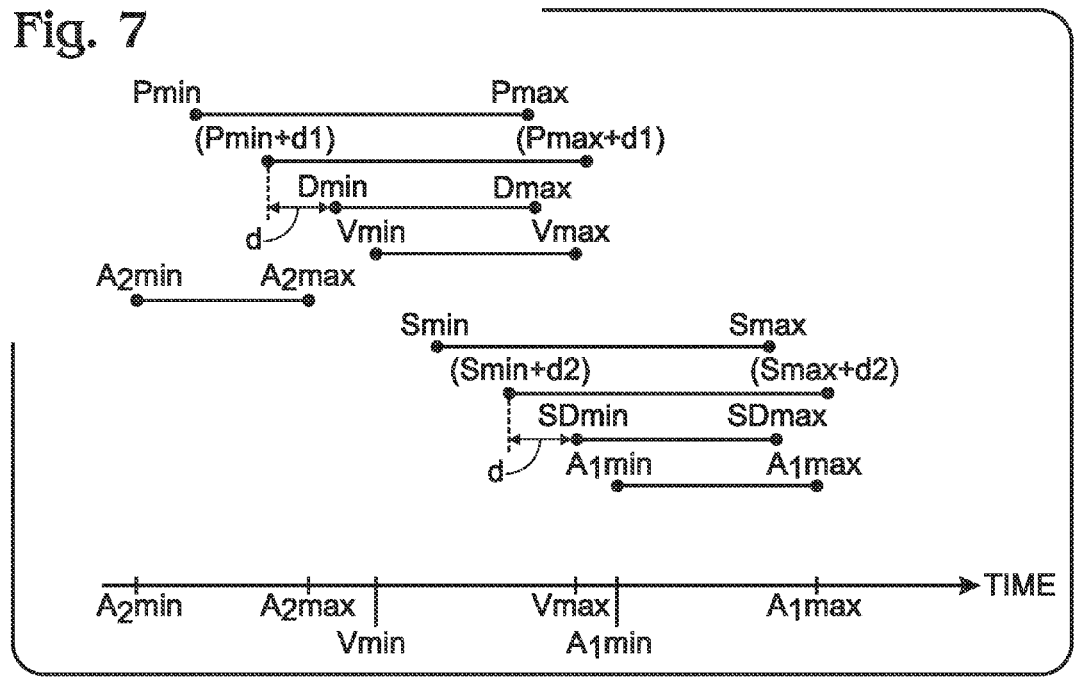
FIG. 7 is a timing diagram associated with the system depicted in FIG. 6.

FIG. 7 is a timing diagram associated with the system depicted in FIG. 6. Without the influence of the first delay circuit 306, the victim net would overlap aggressor net delay range (A2). As in the example of FIGS. 3 and 4, the victim net timing window is shrunk by increasing the delay associated with Vmin. In the interest of brevity, the details of shrinking the victim window are not repeated here.

However, the shrunken victim net would still overlap aggressor net delay range (A1), if the second delay circuit 604 was not present. The shrinking of aggressor net delay range (A1) is performed in a manner analogous to the shrinking of the victim net. Again, to simplify the example, it is assumed that each output 602 has a discrete delay value, as opposed to a range of values. Output 602b may have the smallest Omin value of 5 min, while outputs 306a and 306p both have delay equal to (Smin+d2), which is the largest Omax value. The delays associated with outputs 602a and 602p are not a problem, since these delays fall out of the victim net overlap, once the delay of the second circuit (d2) is added. However, the delay associated with output 602b (Omin=Smin) would overlap the victim net, even after delay d2 is added. The addition of delay (Sd), associated with delay element 608 shrinks the aggressor net from (Smin+d2) to Vmin ((Pmin+d1+d)), and prevents net overlap.

Figure 8:
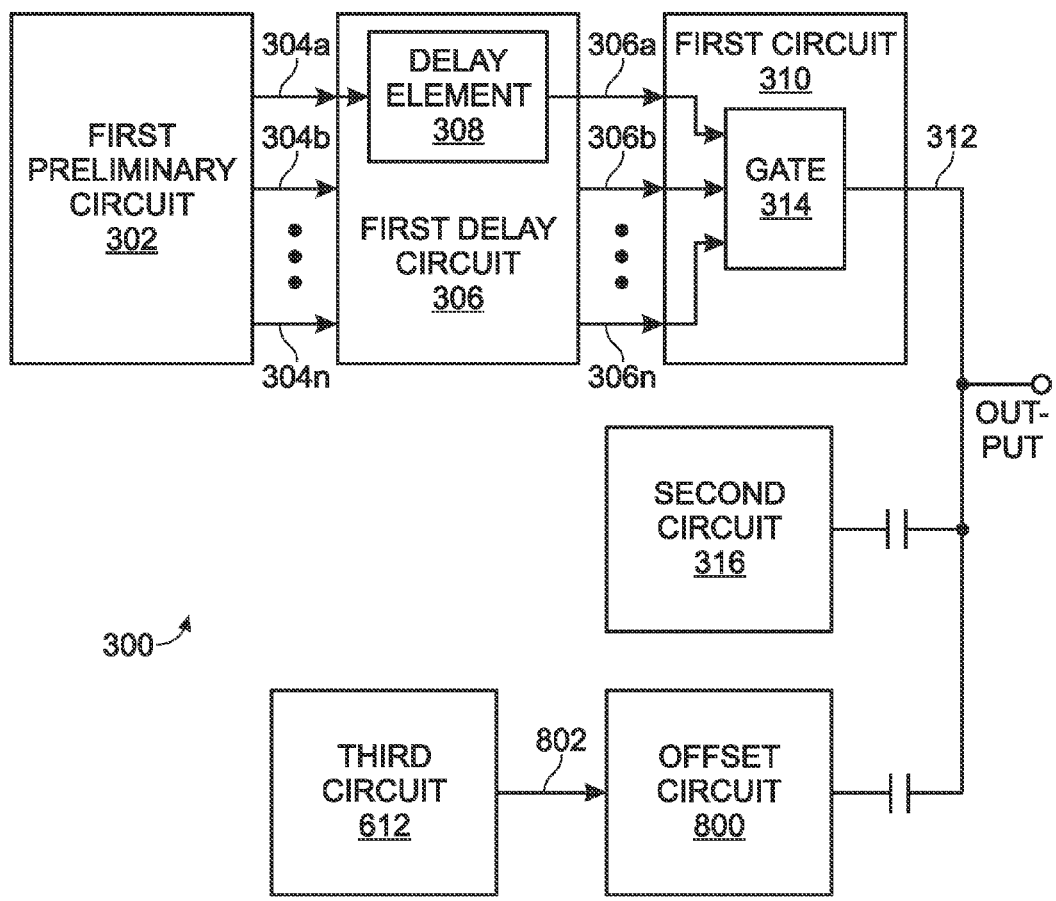
FIG. 8 is a schematic block diagram depicting a second variation of the system of FIG. 3.

FIG. 8 is a schematic block diagram depicting a second variation of the system of FIG. 3. In this aspect, the third circuit 612 has an output on line 802 to supply a third circuit net delay range (Z), characterized by timing window Zmin-Zmax, at least partially overlapping the aggressor net delay range (A1) and the victim net delay range. An offset circuit 800 has an input connected to the third circuit output on line 802 and an output connected to the output node on line 312, to supply an aggressor net delay range (A2), which is the third circuit net delay range (Z: Zmin-Zmax) delayed by the value d3. The aggressor net delay range (A2) fails to overlap the aggressor net delay range (A1). Note: in this aspect, the aggressor net delay range (A1) is a victim net in context to the third circuit net delay range (Z). Advantageously, nets A1 and A2 do not overlap. However, the maximum delay of the third circuit net has been increased.

Figure 9:
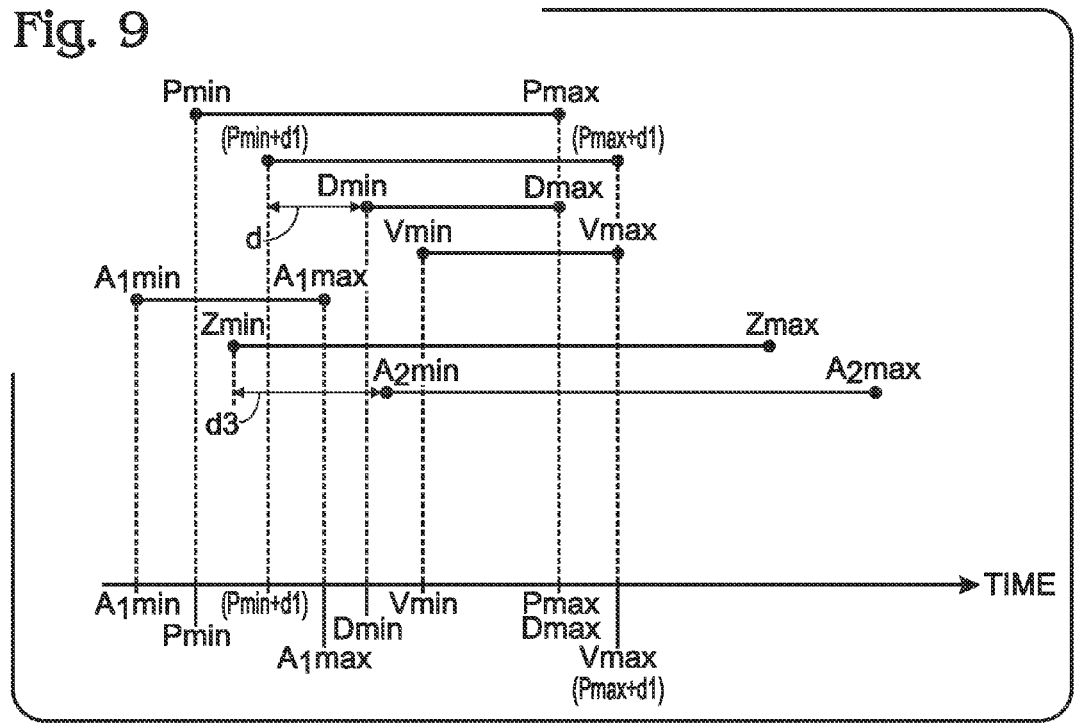
FIG. 9 is a timing diagram associated with the system of FIG. 8.

FIG. 9 is a timing diagram associated with the system of FIG. 8. As in the example of FIG. 4, the victim net is shrunk to eliminate the overlap between the victim net (Vmin-Vmax) and the aggressor net (A1). However, the victim net cannot be shrunk to eliminate overlap with third circuit net Z (Zmin-Zmax). The crosstalk with the victim net can be minimizing by offsetting third circuit net delay range (Z), to eliminate the overlap between net (Z) and aggressor net (A1).

Functional Description

Figure 10:
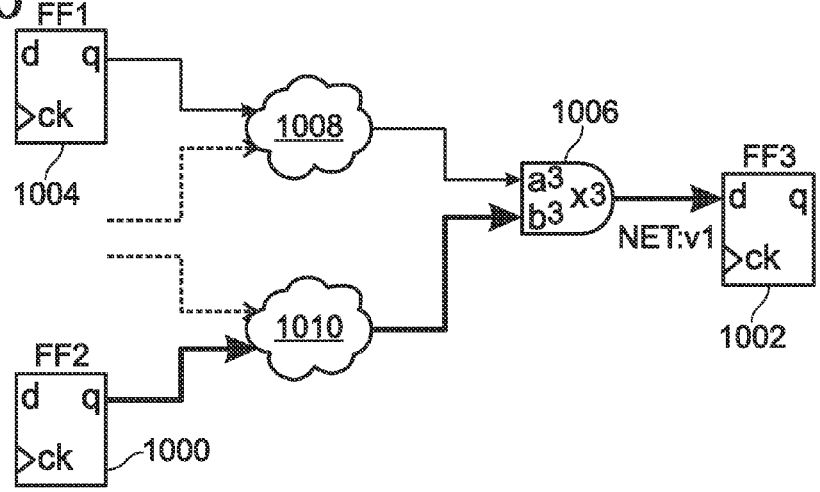
FIG. 10 is schematic diagram depicting an exemplary circuit candidate for victim net timing window shrinkage.

FIG. 10 is schematic diagram depicting an exemplary circuit candidate for victim net timing window shrinkage. There is a timing critical path from flop FF2 (1000) to flop FF3 (1002). The path from flop FF1 (1004) to flop FF3 is bit relaxed and is not timing critical, as there is sufficient setup margin available. The net from the AND gate 1006 output to flop FF3 input (net v1) is the victim net under consideration for crosstalk reduction. The "clouds" 1008 and 1010 represent circuit elements that will be added in subsequent figures.

Figure 11:
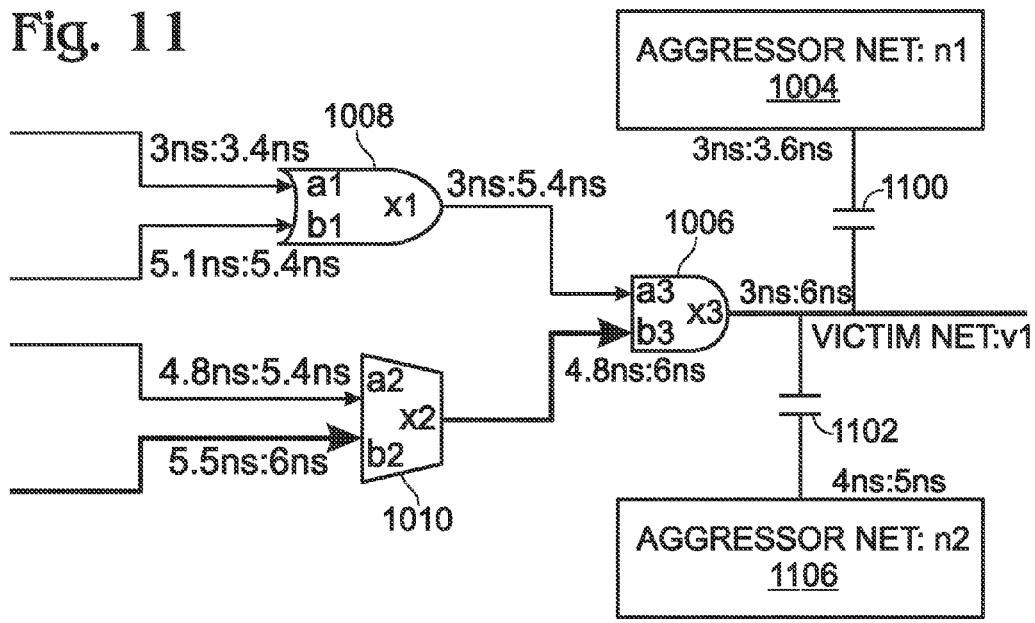
FIG. 11 is the schematic diagram of FIG. 10, where the "clouds" have been replaced with logic gates.

FIG. 11 is the schematic diagram of FIG. 10, where the "clouds" have been replaced with logic gates. The victim net (net v1) is exposed to two aggressor nets: n1 (1004) and n2 (1006), coupled to the victim net via capacitors 1100 and 1102, respectively. Table 1 shows the timing window for each node in the system.

TABLE 1

| Node/net | Timing Window (min:max) |
|---|---|
| a1 | 3 ns:3.4 ns |
| b1 | 5.1 ns:5.4 ns |
| x1 | 3 ns:5.4 ns |
| a2 | 4.8 ns:5.4 ns |
| b2 | 5.5 ns:6 ns |
| x2 | 4.8 ns:6 ns |
| a3 = x1 | 3 ns:5.4 ns |
| b3 = x2 | 4.8 ns:6 ns |
| x3/v1 | 3 ns:6 ns |
| n1 | 3 ns:3.6 ns |
| n2 | 4 ns:5 ns |

Since the timing windows of aggressors n1 and n2 are overlapping with the victim net v1, there is a timing impact in the highlighted timing critical path.

Figure 12:
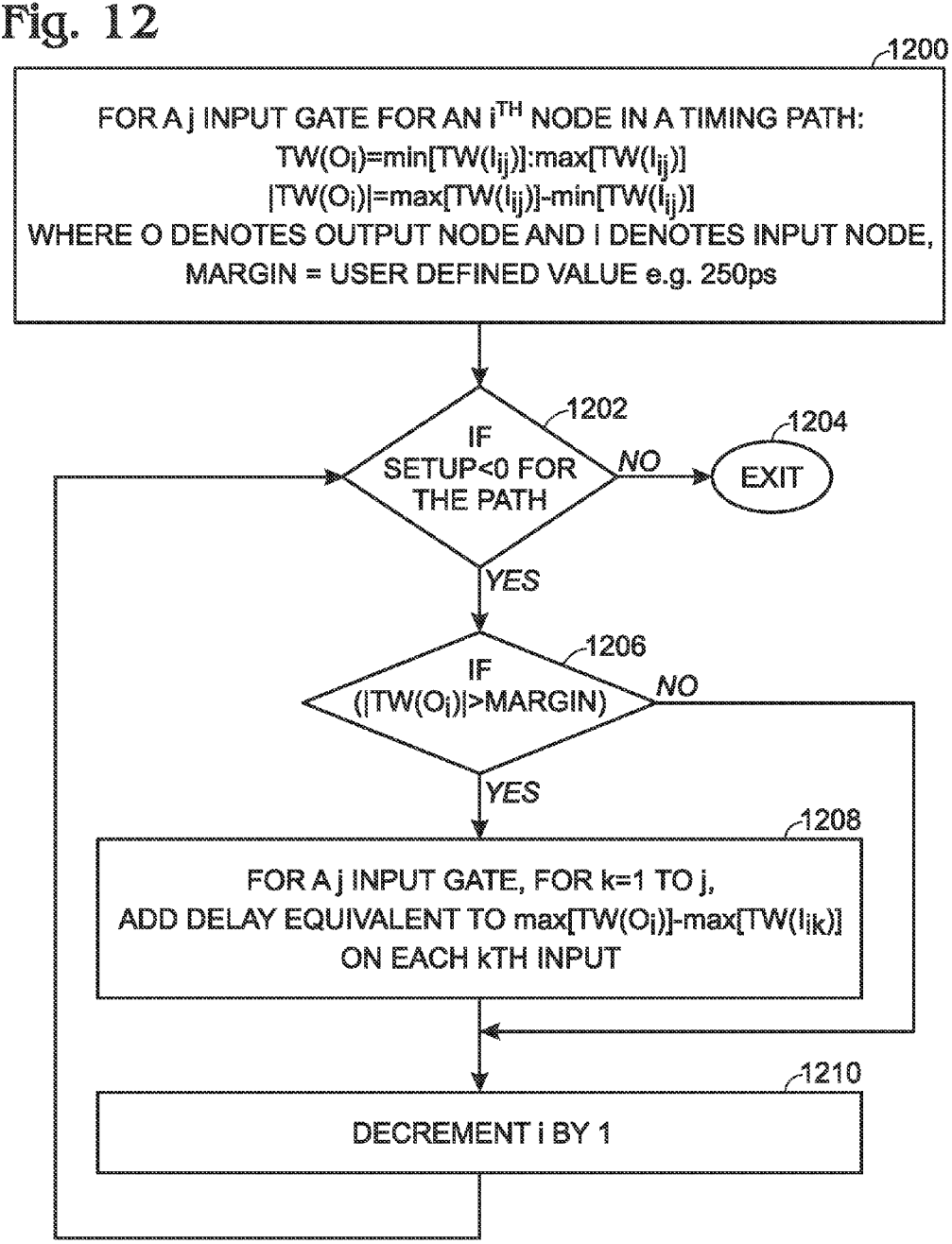
FIG. 12 is a flowchart supporting a method for shrinking a victim net timing window.

FIG. 12 is a flowchart supporting a method for shrinking a victim net timing window. In Step 1200 a user-defined value for the margin is defined as 250 picoseconds (ps), the setup slack in the highlighted timing paths is −200 (ps), and the crosstalk delta delay on the victim net v1 is also 200 ps. In Step 1202 a determination is made if slack <0. If not, the method exits in Step 1204. Here, since the setup slack is equal to −200 ps, so the method proceeds to Step 1206. |TW(x3)|=6 ns−3 ns=3 ns. Since 3 ns is greater than the margin (250 ps), the method goes to Step 1208. Otherwise, the method goes to Step 1210, where i is decremented (a new node is selected). In Step 1208 a delay is added to each input node equal to the difference between the maximum output delay and maximum delay for that input. For node a3, a delay equal to max[TW(x3)]−max[TW(a3)] (6 ns−5.4 ns=0.6 ns) is added. For node b3, a delay equal to max[TW(x3)]−max[TW(b3)] (6 ns−6 ns=0 ns) is added.

Figure 13:
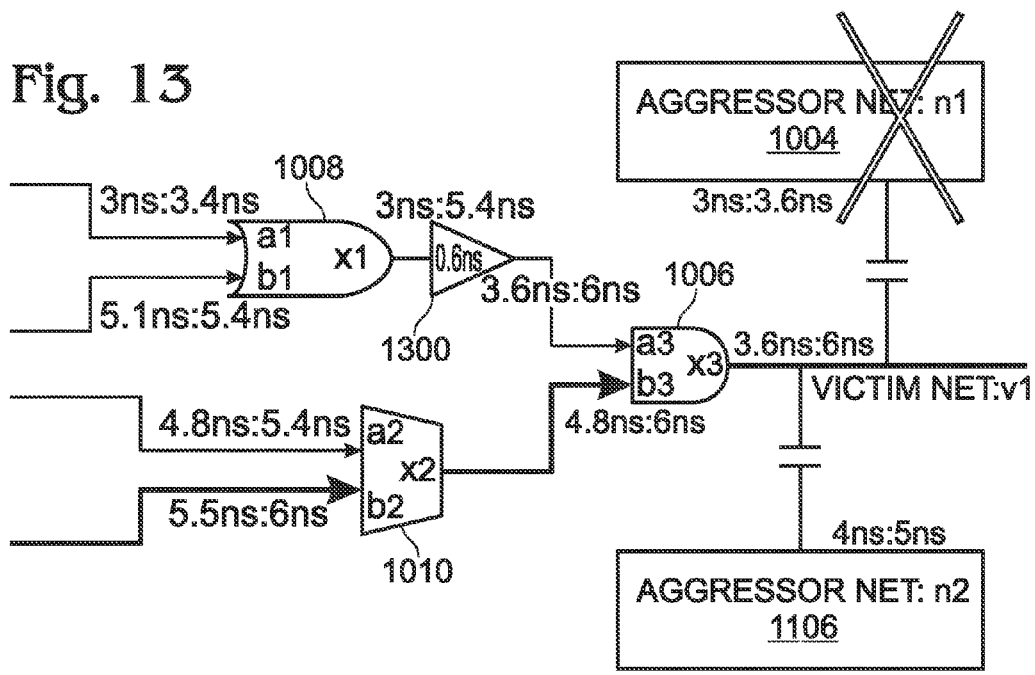
FIG. 13 is a schematic diagram of the system of FIG. 11, after the addition of the delays calculated using the method of FIG. 12.

FIG. 13 is a schematic diagram of the system of FIG. 11, after the addition of the delays calculated using the method of FIG. 12. Delay element 1300, with a delay of 0.6 ns, is interposed between output node x1 and input node a3. With the addition of delay element 1300, the timing window of node a3 has shifted by 600 ps and, thus, the timing window of victim net v1 has shrunk from 3 ns:6 ns to 3.6 ns:6 ns. Since aggressor net n1 and victim net v1 timing windows no longer overlap, net n1 is no longer an aggressor for v1.

Figure 14:
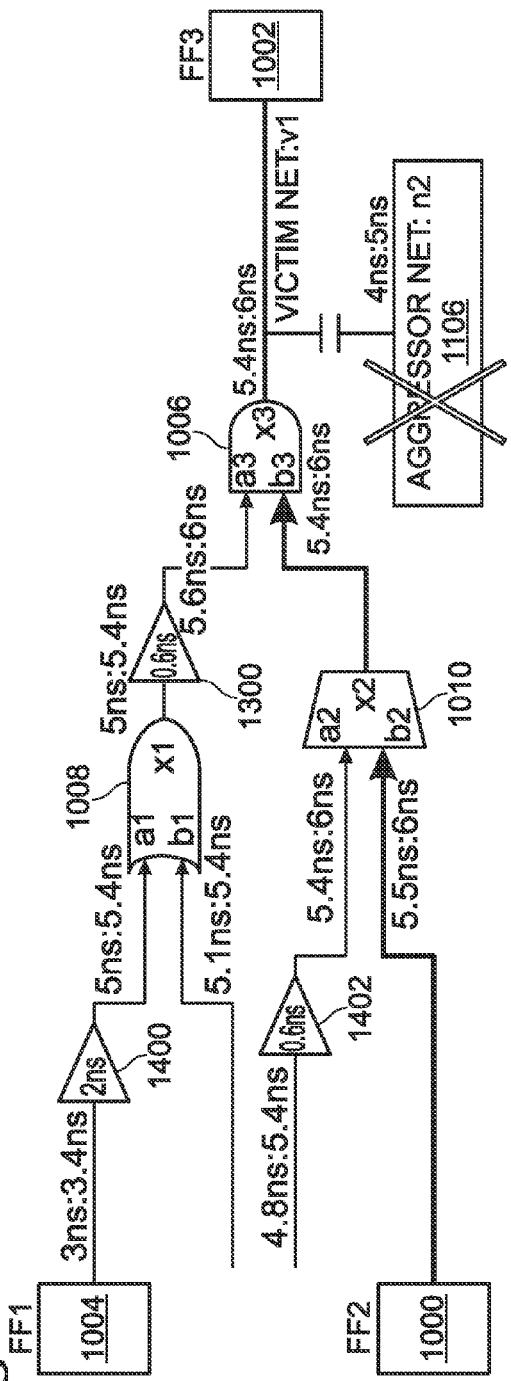
FIG. 14 is a schematic block diagram with the addition of a delay element that prevents overlap between the victim net and aggressor net n2.

FIG. 14 is a schematic block diagram with the addition of a delay element that prevents overlap between the victim net and aggressor net n2. Similarly, for nodes a1 and b1, node a1 can be delayed by 5.4 ns−3.4 ns=2 ns (delay element 1400) and node a2 can be delayed by 5.4 ns−5.4 ns=0 ns. Node a2 can be delayed by 6 ns−5.4 ns=0.6 ns (delay element 1402) and node b2 can be delayed by 6 ns−6 ns=0 ns.

As can be seen from the figure, after delaying node a1 by 2 ns and node a2 by 0.6 ns, the timing window profile of the victim net v1 has shrunk again. Now, the victim net v1 timing window does not overlap the aggressor net n2 timing window. The crosstalk delta delay on net n2 becomes zero and the −200 ps setup slack changes into 0 ps. The timing critical path from flop FF2 1000 to flop FF3 1002 (highlighted in black) has not been delayed, achieving a positive slack. As described above in the explanation of FIGS. 6 and 7, the same methodology used to shrink the victim net timing windows can be applied to aggressor net timing windows.

Figure 15:
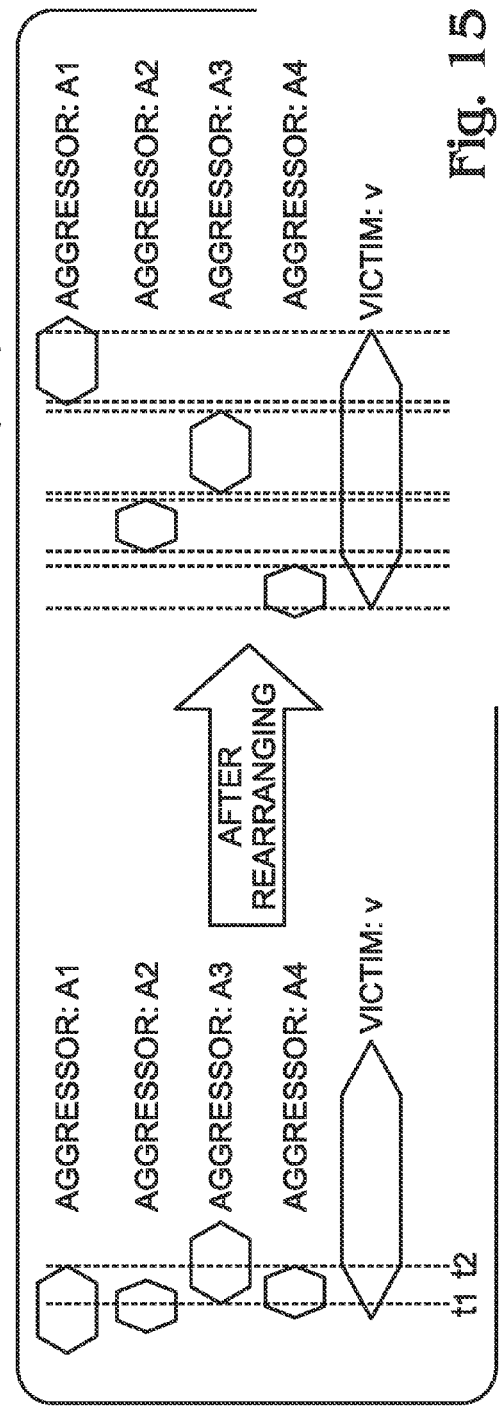
FIG. 15 is a timing diagram depicting the overlap between a victim net timing window and a plurality of aggressor net timing windows.

FIG. 15 is a timing diagram depicting the overlap between a victim net timing window and a plurality of aggressor net timing windows. As described above in the explanation of FIGS. 8 and 9, if it is not possible to shrink the timing windows of aggressor/victim nets further, an offset technique can be used to ensure that the simultaneous switching of all the aggressor nets can be avoided by rearranging the timing windows of the aggressor nets.

For example, four aggressor nets (A1, A2, A3, A4) are shown overlapping victim net v. There is a time interval t1-t2 when all the aggressors A1-A4 and V are switching. Since the timing window for all the nets overlap, the crosstalk impact is large. However by adding delay on certain aggressor nets and by optimizing the delay for other aggressor nets, their timing windows are shift towards the negative time axis (the max and min component of the timing window is reduced). The timing windows are shifted in such a manner that the minimum number of aggressor nets (1) switch simultaneously with the victim net v. Thus, the coupling impact of each of these aggressor nets on the victim net v is individual rather than being cumulative, reducing the crosstalk noise impact on the victim net v.

Figure 16:
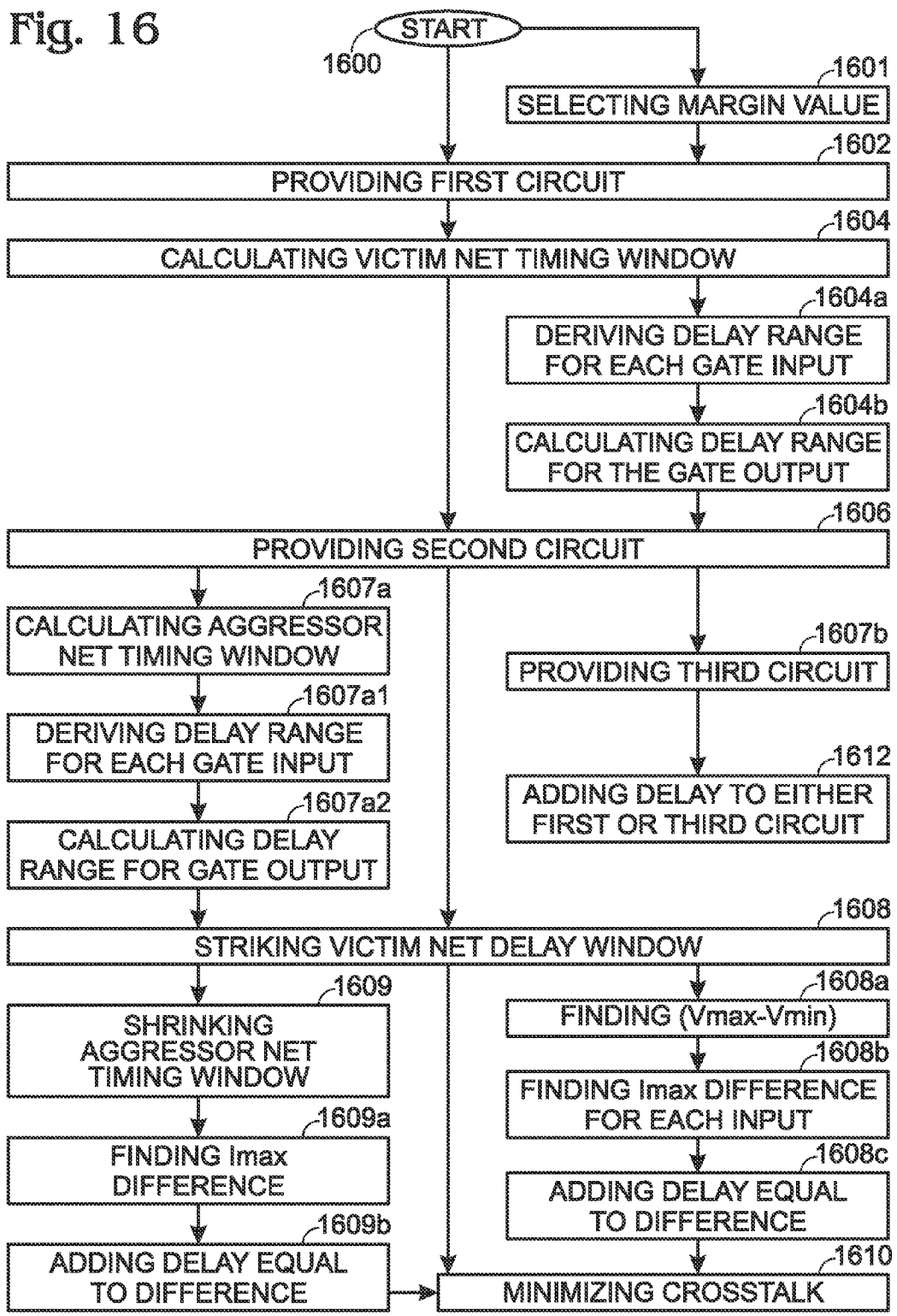
FIG. 16 is a flowchart illustrating a circuit analysis tool, enabled with software instructions stored in a computer-readable medium and executed by a processor, for minimizing circuit crosstalk.

FIG. 16 is a flowchart illustrating a circuit analysis tool, enabled with software instructions stored in a computer-readable medium and executed by a processor, for minimizing circuit crosstalk. The use of computers to read and execute instructions from memory is well known in the art, and the instructions are not limited to any particular protocol or computer hardware.

Various steps in the instructions may be referred to as a "component," "module," "system," and the like, and are intended for use with an automated computing system entity, such as hardware, firmware, a combination of hardware and software, software, software stored on a computer-readable medium, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

The instructions described herein are stored on a physical memory medium or computer-readable medium. As used herein, the term "computer-readable medium" refers to any medium that participates in providing instructions to a processor for execution. Such a medium may take many forms, including but not limited to, non-volatile media, volatile media, and transmission media. Non-volatile media includes, for example, optical or magnetic disks. Volatile media includes dynamic memory. Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Although the method performed by the instructions is depicted as a sequence of numbered steps for clarity, the numbering does not necessarily dictate the order of the steps. It should be understood that some of these steps may be skipped, performed in parallel, or performed without the requirement of maintaining a strict order of sequence. Generally however, the steps are performed in numerical order. The instructions start at Step 1600.

Step 1602 provides a first circuit connected to an output mode, having a last gate with a plurality of inputs and an output. Step 1604 calculates a first circuit victim net delay range having a minimum delay (Vmin) and a maximum delay (Vmax). Step 1606 provides a second circuit having an output connected to the output node to supply an aggressor net delay range (A1) having a minimum delay (A1$min$) and a maximum delay (A1$max$). The aggressor net delay range at least partially overlaps the victim net delay range. Without increasing the value of Vmax, Step 1608 shrinks the first circuit victim net delay range. Step 1610 minimizes crosstalk between the first and second circuits without an increase in first circuit maximum signal delay. If shrinking the first circuit victim net delay range in Step 1608 includes eliminating the overlap between the victim net delay range and aggressor net delay range, then Step 1610 eliminates crosstalk between the first and second circuits.

In one aspect, calculating the first circuit victim net delay range in Step 1604 includes substeps. Step 1604$a$ derives a range of signal delays (Imin and Imax) for each last gate input (j). In response to deriving the smallest Imin value and the largest Imax value, Step 1604$b$ calculates the range of signal delays for the gate output. Shrinking the victim net delay range in Step 1608 includes the following substeps. For each input (j), Step 1608$b$ finds the difference between the largest Imax value and the I$_j$max value for that input. Step 1608$c$ adds a circuit delay prior to each gate input, equal to the difference.

In another aspect, Step 1601 selects a margin value. Then, shrinking the victim net delay range in Step 1608 includes additional substeps. Step 1608$a$ finds the difference between Vmax and Vmin, and Step 1608$c$ adds the circuit delays prior to each gate input if the difference is greater than the margin value.

As noted above in the explanation of FIGS. 6 and 7, both the victim net and an aggressor net timing window can be shrunk, without affecting the timing critical path. In that case, Step 1606 provides a second circuit with a last gate having a plurality of inputs and an output. Step 1607$a$ calculates the second circuit aggressor net (A1) delay range with the following substeps. Step 1607$a$1 derives a range of signal delays (Imin and Imax) for each last gate input (j). In response to deriving the smallest Imin value and the largest Imax value, Step 1607$a$2 calculates the range of signal delays for the gate output. Step 1609 shrinks the second circuit aggressor net delay range (A1) without increasing the value of A1$max$, with the following substeps. For each input (j), Step 1609$a$ finds the difference between the largest Imax value and the I$_j$max value for that input. Step 1609$b$ adds a circuit delay prior to each gate input, equal to the difference.

In a different aspect, Step 1607$b$ provides a third circuit having the output connected to the output node to supply an aggressor net delay range (A2) at least partially overlapping the victim net delay range and the aggressor net delay range (A1). Step 1612 adds a delay to either the second or third circuit, such that A1 does not overlap A2. Note: Step 1612 may be performed in parallel with Step 1609, which shrinks the second circuit net delay range (A1), the third circuit net delay range (A2), or both A1 and A2. Alternately, Step 1607$b$ provides a third circuit, and Step 1609 may shrinks the second circuit net delay range (A1), the third circuit net delay range (A2), or both A1 and A2, without the performance of Step 1612.

FIG. 17 is a flowchart illustrating a variation of the circuit analysis tool of FIG. 16, for minimizing circuit crosstalk exposure. The instructions begin at Step 1700. Step 1702 provides a first circuit connected to an output mode, having a last gate with a plurality of inputs and an output. Step 1704 provides a second circuit having an output connected to the output node to supply an aggressor net delay range (A1) having a minimum delay (A1$min$) and a maximum delay (A1$max$), where the aggressor net delay range at least partially overlaps the victim net delay range. Step 1706 provides a third circuit having the output connected to the output node to supply an aggressor net delay range (A2) at least partially overlapping the victim net delay range and the aggressor net delay range (A1). Step 1708 calculates a first circuit victim net delay range having a minimum delay (Vmin) and a maximum delay (Vmax). Step 1710 adds a delay to either the second or third circuit, such that A1 does not overlap A2. Step 1712 minimizes crosstalk between the first circuit, and the second and third circuits, without an increase in the first circuit maximum signal delay.

Systems and methods have been provided for reducing crosstalk between circuit net timing windows. Particular circuit elements and process steps have been used to illustrate the invention, but the invention is not necessarily limited to just these examples. Other variations and embodiments of the invention will occur to those skilled in the art.

We claim:

1. A circuit analysis tool, enabled with software instructions stored in a non-transitory computer-readable medium and executed by a processor, for minimizing circuit crosstalk, the instructions comprising:

providing a first circuit connected to an output node having a last gate with a plurality of inputs and an output;

calculating a first circuit victim net delay range having a minimum delay (Vmin) and a maximum delay (Vmax);

providing a second circuit having an output connected to the output node to supply an aggressor net delay range (A1) having a minimum delay (A1$min$) and a maximum delay (A1$max$), where the aggressor net delay range at least partially overlaps the victim net delay range;

without increasing the value of Vmax, shrinking the first circuit victim net delay range; and, minimizing crosstalk between the first and second circuits without an increase in first circuit maximum signal delay.

2. The instructions of claim 1 wherein calculating the first circuit victim net delay range includes:
deriving a range of signal delays (Imin and Imax) for each last gate input (j);
in response to deriving the smallest Imin value and the largest Imax value, calculating the range of signal delays for the gate output;
wherein shrinking the victim net delay range includes:
for each input (j), finding the difference between the largest Imax value and the $I_j$max value for that input; and,
adding a circuit delay prior to each gate input, equal to the difference.

3. The instructions of claim 2 shrinking the first circuit victim net delay range includes eliminating the overlap between the victim net delay range and aggressor net delay range; and,
wherein minimizing the crosstalk includes eliminating crosstalk between the first and second circuits.

4. The instructions of claim 2 further comprising:
selecting a margin value; and,
wherein shrinking the victim net delay range further includes finding the difference between Vmax and Vmin; and,
wherein adding the circuit delays prior to each gate input includes adding the circuit delays if the difference is greater than the margin value.

5. The instructions of claim 1 wherein providing the second circuit includes providing a second circuit with a last gate having a plurality of inputs and an output; and,
the instructions further comprising:
shrinking the second circuit aggressor net delay range (A1) without increasing the value of A1$max$.

6. The instructions of claim 5 further comprising:
calculating the second circuit aggressor net (A1) delay range as follows:
deriving a range of signal delays (Imin and Imax) for each last gate input (j);
in response to deriving the smallest Imin value and the largest Imax value, calculating the range of signal delays for the gate output;
wherein shrinking the second circuit aggressor net de ay range (A1) includes:
for each input (j), finding the difference between the largest Imax value and the $I_j$max value for that input; and,
adding a circuit delay prior to each gate input, equal to the difference.

7. The instructions of claim 1 further comprising:
providing a third circuit having the output comiected to the output node to supply an aggressor net delay range (A2) at least partially overlapping the victim net delay range and the aggressor net delay range (A1);
adding a delay to a circuit selected from a group consisting of the second and third circuits, such that A1 does not overlap A2.

8. The instructions of claim 7 further comprising:
shrinking the aggressor net delay range of a circuit selected from a group consisting of the second circuit, the third circuit, and both the second and third circuits.

9. The instructions of claim 1 further comprising:
providing a third circuit having the output comiected to the output node to supply an aggressor net signal delay range (A2) at least partially overlapping the victim net delay range and the aggressor net delay range (A1);
the instructions further comprising:
shrinking the aggressor net delay range of a circuit selected from a group consisting of the second circuit, the third circuit, and both the second and third circuits.

10. A circuit analysis tool, enabled with software instructions stored in a non-transitory computer-readable medium and executed by a processor, for minimizing circuit crosstalk exposure, the instructions comprising:
providing a first circuit connected to an output node having a last gate with a plurality of inputs and an output;
providing a second circuit having an output connected to the output node to supply an aggressor net delay range (A1) having a minimum delay (A1$min$) and a maximum delay (A1$max$), where the aggressor net delay range at least partially overlaps the victim net delay range;
providing a third circuit having the output connected to the output node to supply an aggressor net delay range (A2) at least partially overlapping the victim net delay range and the aggressor net delay range (A1);
calculating a first circuit victim net delay range having a minimum delay (Vmin) and a maximum delay (Vmax);
adding a delay to a circuit selected from a group consisting of the second and third circuits, such that A1 does not overlap A2;
minimizing crosstalk between the first circuit, and the second and third circuits, without an increase in the first circuit maximum signal delay.

* * * * *

UNITED STATES PATENT AND TRADEMARK OFFICE
CERTIFICATE OF CORRECTION

| | | |
|---|---|---|
| PATENT NO. | : 8,205,181 B1 | Page 1 of 1 |
| APPLICATION NO. | : 12/718624 | |
| DATED | : June 19, 2012 | |
| INVENTOR(S) | : Sunil Singla and Sudhir Koul | |

It is certified that error appears in the above-identified patent and that said Letters Patent is hereby corrected as shown below:

In Claim 6, column 11, line 46, the word "delay" has been incorrectly printed as "de ay".

In Claim 7, column 12, line 4, the word "connected" has been incorrectly printed as "comiected".

In Claim 9, column 12, line 17, the word "connected" has been incorrectly printed as "comiected".

Signed and Sealed this
Twenty-first Day of August, 2012

David J. Kappos
*Director of the United States Patent and Trademark Office*